United States Patent [19]
Vogel

[11] Patent Number: 5,473,114
[45] Date of Patent: Dec. 5, 1995

[54] CLEAR TUBE SECTION FOR PNEUMATIC TRANSPORT TUBE SYSTEM

[75] Inventor: Victor J. Vogel, Oak Ridge, N.J.

[73] Assignee: Mosler, Inc., Wayne, N.J.

[21] Appl. No.: 48,289

[22] Filed: Apr. 14, 1993

[51] Int. Cl.$^6$ .................................................. B65G 51/00
[52] U.S. Cl. ........................... 174/47; 52/656.9; 403/402; 406/112; 406/191
[58] Field of Search .............................. 174/47; 406/191, 406/110, 111, 112; 138/162, 163, 158, 157, 156, DIG. 4, DIG. 11; D18/35; D23/387, 266; D25/16; 52/656.9; 403/402, 403, 205

[56] References Cited

U.S. PATENT DOCUMENTS

| | | | |
|---|---|---|---|
| 943,329 | 12/1909 | Wolever | 406/191 X |
| 1,129,040 | 2/1915 | McClure | 138/158 |
| 2,333,026 | 10/1943 | McDonough | 138/158 |
| 4,715,750 | 12/1987 | Podoll et al. | 406/111 |
| 5,219,403 | 6/1993 | Murphy | 138/162 X |

FOREIGN PATENT DOCUMENTS

| | | | |
|---|---|---|---|
| 0223272 | 11/1942 | Switzerland | 403/205 |
| 0635151 | 4/1950 | United Kingdom | 138/158 |

Primary Examiner—Leo P. Picard
Assistant Examiner—Hyung S. Sough
Attorney, Agent, or Firm—Wood, Herron & Evans

[57] ABSTRACT

A quadrilateral transparent tube section that is used with a heavy payload captive carrier in a pneumatic transport system. The tube section is constructed of four transparent panels connected at their longitudinal edges with four corner structures which contain longitudinal cavities that may be used as wiring conduits.

15 Claims, 3 Drawing Sheets

CLEAR TUBE SECTION FOR PNEUMATIC TRANSPORT TUBE SYSTEM

BACKGROUND OF THE INVENTION

1. Field of the Invention

The present invention relates generally to the area of fluid current conveyors, and more particularly, to a transparent vertical tube section for a pneumatic transport tube system.

2. Description of the Related Art

Pneumatic transport tube systems typically transport a carrier through a transport tube between two terminals. The carrier is moved by creating pressure differentials within the transport tube with respect to the ends of the carrier. Pneumatic transport tube systems are often utilized by banks to transfer money and documents between a customer and a teller. A teller terminal is located in the bank, and a customer terminal is located outside the bank at a location permitting the customer to use the customer terminal from a vehicle. The transport tubes between the teller and customer terminals are either run underground or overhead. It is preferable that the customer and teller be in visual contact during the transaction. Pneumatic transport tubes which run overhead exit vertically from the top of the customer terminal for approximately three meters. The transport tube then runs horizontally into the bank and terminates with another vertical tube section into the teller terminal. Consequently, the vertical tube sections present obstructions to the customer and teller being able to be in a direct line of sight with each other. The problem is aggravated by pneumatic transport tube systems which are designed to transport a captive heavy payload carrier. Such a carrier, which may accommodate a payload of 25 lbs. (11.5 Kg), is significantly larger than the more common noncaptive cylindrical carrier. A transport tube for such a captive heavy payload carrier is correspondingly larger and further obstructs the view between the teller and customer.

To provide the desirable line-of-sight visual communication between the teller and customer, it is known to utilize a transparent vertical transport tube section, as disclosed in U.S. Pat. No. 4,715,750. The patent illustrates a rectangular transport tube section located immediately above the teller and customer terminals.

Not only is visual communication between the customer and teller important, but other forms of communication are also important. For example, preferably the customer and teller can speak to each other; and therefore, each terminal must have a speaker, a microphone and audio signal wires running therebetween. In addition, it may be desirable for the teller to be able to operate and to be apprised of the operational status of the customer terminal unit. For example, the teller may wish to open or close the customer unit or know whether limit switches associated with the opening and closing, are properly activated. Therefore, it is necessary for electrical control wires to run between the customer and teller units. Further, each of the terminal units has power devices such as motors and blowers, which require larger wires to satisfy the power requirements of those devices. Those wires may run from the terminal units to another location within the transport tube system or between the terminal units themselves. Further, in order to avoid electrical interference, it may be necessary to isolate the power wires by running them through a separate conduit.

Heretofore, the above wires were run to their various locations by running the wires through a metal conduit which is either run underground between the customer and terminal units or is attached to the exterior of the transport tube. Attaching the conduit to the exterior of a transparent tube section is aesthetically unacceptable. Therefore, the utilization of a transparent transport tube section has the disadvantage of requiring that communication, control and power wires be run underground. Running the wires and conduit between the terminals underground adds substantial expense to the installation.

SUMMARY OF THE INVENTION

To overcome the disadvantages associated with running the wires underground, the present invention provides a transparent quadrilateral transport tube section constructed with corner structures having respective longitudinal cavities which are used to run wires through the tube sections. The invention is especially suited for use with a heavy payload quadrilateral captive carrier which requires a relatively large transport tube section. The transparent transport tube section is mounted vertically from the top of either or both of the customer and teller terminals and extends vertically upward into right angle corner tube sections which are joined by a metal horizontal transport tube section.

According to the principles of the present invention and in accordance with the described embodiments, the transparent quadrilateral transport tube section is preferably square and is comprised of four mutually perpendicular transparent panels. The panels are joined at their longitudinal edges by four corner structures. Each of the corner structures has an internal corner member having two perpendicular internal walls. The corner structure further includes an external corner member having two perpendicular external walls. The outer ends of the external walls have a short section formed inwardly approximately 90°, and the longitudinal edges of the short section are connected to the inner corner member thereby forming a longitudinal cavity between the internal and external corner members. Electrical wiring may be located within the longitudinal cavity to interconnect electrical devices associated with the ends of the tube section. Edge connectors on the longitudinal edges of the corner structures are adapted to receive the longitudinal edges of the four transparent panels thereby facilitating fabrication of the transparent tube section.

The construction of the present invention has the advantage of not requiring the wiring to be buried in a conduit underground. The invention has the further advantage of providing multiple physically separated wiring channels by virtue of each corner structure providing a conduit. Therefore, power wires may be separated from more sensitive control and communication wires. The invention has the further advantage of allowing the wires to be run outside of the quadrilateral cross-sectional area of the transport tube required for the carrier without being obtrusive or visible.

These and other objects and advantages of the present invention will become more readily apparent during the following detailed description in conjunction with the drawings herein.

DETAILED DESCRIPTION OF THE INVENTION

Figure 1:
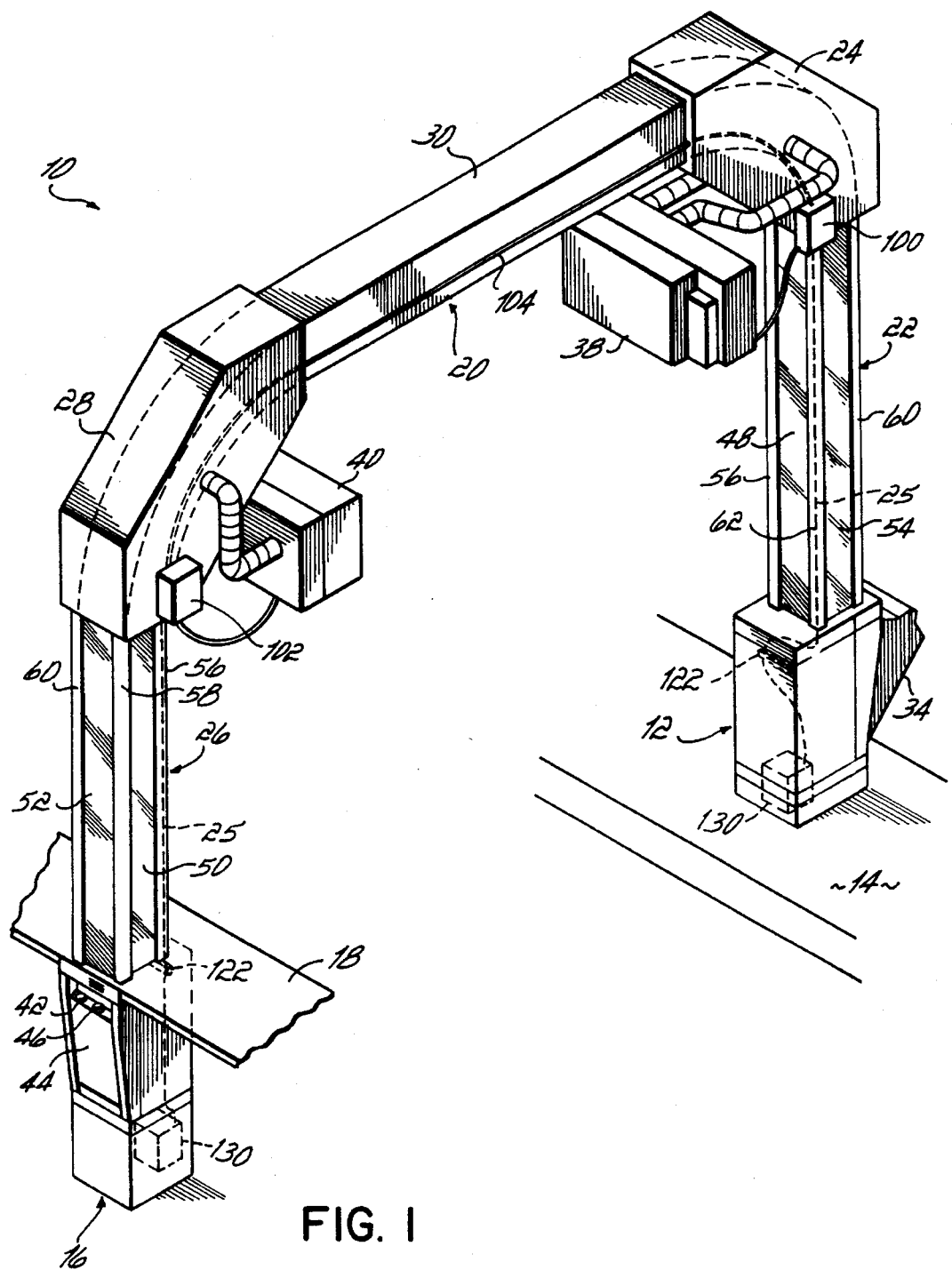
FIG. 1 is a perspective view of the quadrilateral transport tube system utilizing the present invention.
Figure 2:
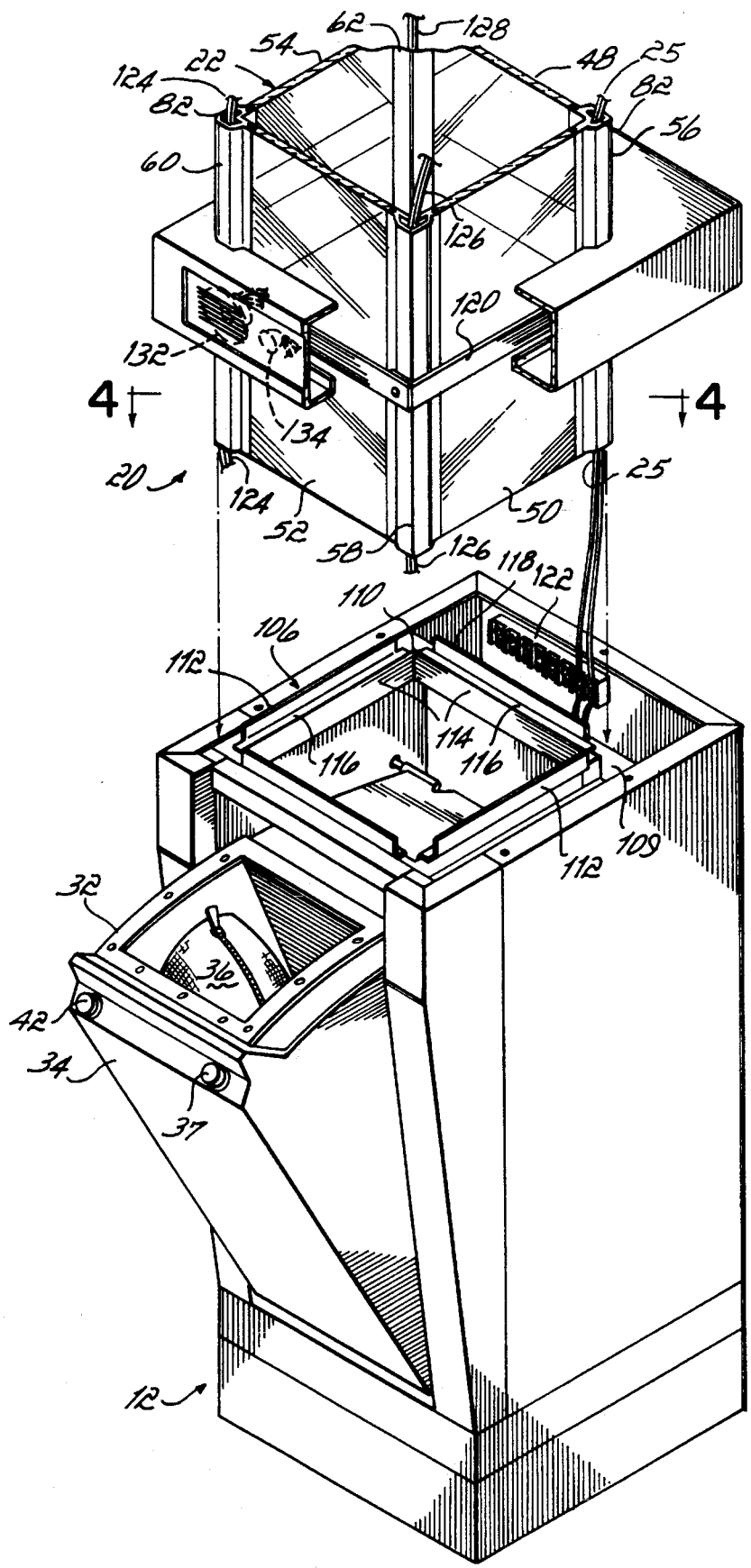
FIG. 2 is a perspective view illustrating the quadrilateral transport tube assembled from its corresponding terminal unit.
Figure 4:
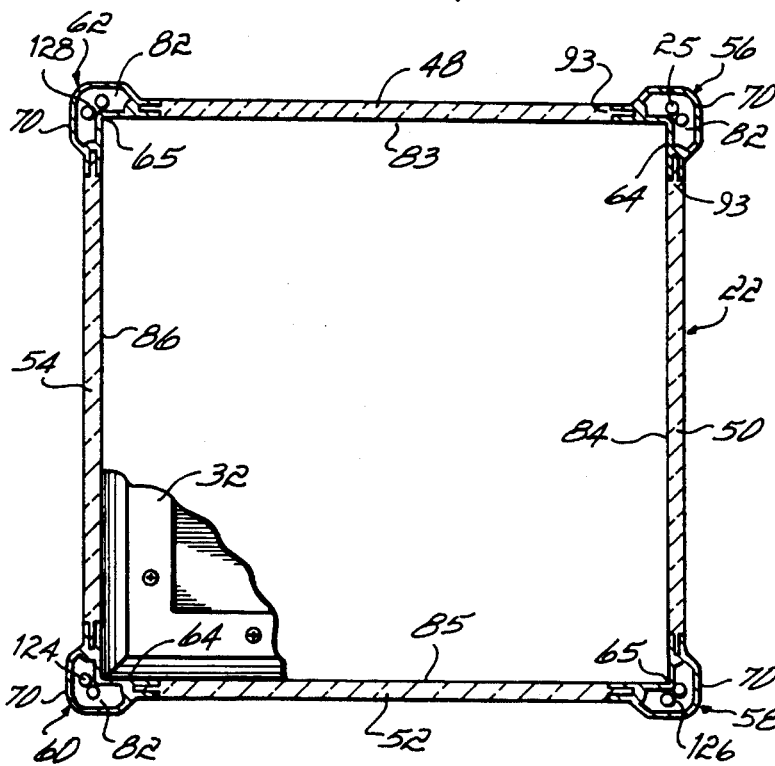
FIG. 4 is a cross-sectional view of the quadrilateral transport tube taken along line 4—4 of FIG. 2.

FIG. 1 illustrates a pneumatic transport tube system 10 of the type illustrated with the present invention. The transport tube system 10 is comprised of a customer terminal 12 located on an island 14 which is readily accessible by customers in vehicles. A teller terminal 16 is located near a teller counter 18 inside the bank. The terminals 12 and 16 are connected by a transport tube system 20. The quadrilateral transport tube system 20 preferably has a square cross-section as shown in FIGS. 2 and 4 and is comprised of a first vertical tube section 22 which terminates into a first corner tube section 24. A second quadrilateral vertical tube section 26 terminates into a second corner tube section 28, and a quadrilateral horizontal tube section 30 extends between the first and second corner tube sections 24 and 28, respectively.

The first and second vertical tube sections 22 and 26 are identical in construction, and therefore only the first vertical tube section 22 will be described in detail. Referring to FIG. 2, the customer terminal 12 has a captive carrier 32 contained in a bin 34 which pivots between the illustrated presentation position and a vertical position (not shown) at which the carrier and bin are pivoted back into the terminal 12. As the carrier 32 and bin 34 pivot between the presentation and the vertical positions, a cover on the end of the carrier 32 is opened and closed, respectively. Therefore, when in the presentation position, the customer may deposit or remove materials 36 from the carrier 32. When the customer is finished with the transaction, the customer activates a send switch 37; and the carrier 32 and bin 34 then are pivoted back to the vertical position. Referring to FIG. 1, first and second blower motors 38 and 40, respectively, are turned on such that air is removed from the transport tube system, thereby creating a pressure differential across the carrier 32. The pressure differential is effective to lift the carrier out of the customer terminal 12 and through the first vertical tube section 22. As the carrier passes through the first corner tube section 24, blower motor 38 is turned off; and blow motor 40 pulls the carrier through the horizontal tube section 30 and into the second corner tube section 28. At that point, the second blower motor 40 is turned off; and gravitational forces pull the carrier through the second vertical tube section 26, The column of air trapped below the carrier 32 within the second vertical tube section 26, compresses as the carrier drops through the tube section 26, and the compressed column of air operates to slow the carrier as it enters the teller terminal 16. The teller then activates an open switch 42, FIG. 2, which causes the carrier and teller bin 44 to pivot to a presentation position for the teller. When the teller completes the transaction, the teller activates the teller send switch 46 to transport the carrier back through the transport tube system to the customer terminal 12.

The illustrated transport tube system 10 utilizes a large captive carrier 32 which is designed for heavy payloads. Further, the larger size of the carrier 32 and transport tube system 10 requires that the system be run overhead between the customer and teller terminals versus underground. If the vertical tube sections 22 and 26 are metal fabrications, they have the disadvantage of disrupting the desirable line of sight vision between the customer and teller. Therefore, the present invention provides transparent vertical tube sections 22, 26 that do not obstruct the visual contact between the customer and teller. However, the transparent vertical tube sections result in other considerations. Each of the teller and customer terminals contain several electric motors, electric solenoids, control switches such as push buttons, and a microphone and speaker to permit audio communication between the customer and teller. Therefore, numerous teller control signals and communication wires must be run between the two terminals. If the vertical tube sections 22, 26 are metal fabrications, the wires would typically be run through conduit attached to the outside of the vertical tube sections 22, 26 between terminals 12, 16 and the corner tube sections 24, 28. However, applying wiring conduit to the transparent transport tube sections is neither easy nor desirable. Therefore, the transparent vertical tube sections 22, 26 heretofore require that wires connecting the customer and teller terminals 12, 16 be run underground at additional cost. The present invention provides a transparent transport tube construction utilizing a corner structure with a longitudinal cavity that permits the wires 25 to be run through the corner structures of the transparent transport tube.

Figure 5:
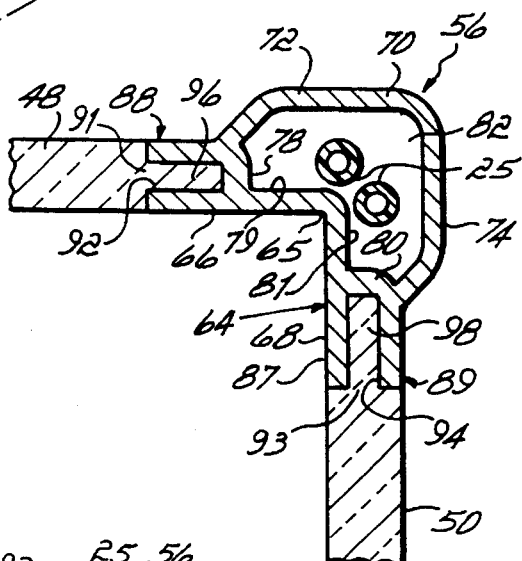
FIG. 5 is an enlarged cross-sectional view illustrating one of the four identical corner structures of the transport tube assembly.

Referring to FIGS. 4 and 5, the transparent tube section 22 is a quadrilateral structure in which the sides are formed by first, second, third and fourth transparent panels 48, 50, 52 and 54, respectively, which are connected to respective first, second and third and fourth corner structures 56, 58, 60 and 62, respectively. The quadrilateral tube section is formed by connecting the four corner structures 56–62 to the longitudinal edges of the four panels 48–54. The transparent panels 48–54 are made of LEXAN, and the corner structures 56–62 are aluminum extrusions. Referring to FIG. 5 which is an enlarged view of the corner structure 56, the corner structure has an internal corner member 64 comprised of perpendicular internal walls 66 and 68 connected together to form a corner 65 therebetween. The corner structure 56 further includes an external corner member 70 having two perpendicular external walls 72 and 74, which are joined to form the external corner member 70. The external corner member 70 is larger than the internal corner member 64, and the external member 70 is connected to the internal walls 66 and 68 to form a cavity 82. The cavity is bounded by the external member 70 and the outer directed surfaces 79, 81 which are opposite and generally parallel to the inside surfaces 87 of the respective walls 66, 68; and the cavity extends longitudinally through the corner structure 56. The longitudinal cavity 82 is formed by shaping the longitudinal edges of the external walls 72 and 74 inwardly approximately 90° to form end walls 78 and 80, which connect to the internal walls 66 and 68, respectively.

To join the panels 48 and 50 to the corner structure 56, the corner structure 56 has edge connectors 88 and 89 contiguous with the internal walls 66 and 68, respectively. Each of the edge connectors 88 and 89 has a surface adapted to receive one of the longitudinal edges 91 and 93 of the panels 48 and 50, respectively. In the preferred embodiment, the edge connectors 88 and 89 have respective slots 92 and 94 which are sized to receive tangs 96 and 98, respectively, cut into the longitudinal edges 91 and 93 of the respective transparent panels 48 and 50. The quadrilateral tube sections 22, 26 which are formed by the tangs 96, 98 of the transparent panels 48, 50 are joined into the slots 92, 94 of the corner structures by using a room temperature vulcanizing ("RTV") sealing material. The same sealing material is used at other joints where that type of seal is desired. The construction of corner structures 58, 60 and 62 is identical in the construction to the corner structure 56 illustrated in FIG. 5.

As shown in FIG. 4, the internal corners 65 of the internal corner members 64 of corner structure 56, 58, 60, and 62 are right angles to maintain the preferably square cross-section of the quadrilateral transport tube. The external members 70 are shaped to form the longitudinal cavities 82 outside the square cross-section of the transport tube and outside the internal corners 65. Further, the shape of the internal corners 65 must match the exterior shape of the corners on a carrier 32 in order to maintain a pneumatic seal therebetween. In addition, the edge connectors 88, 89 on corner structures 56–62 must be formed such that upon receiving a longitudinal edge of a transparent panel, the internal surfaces 83, 84, 85 and 86 of the panels 48, 50, 52 and 54, respectively, are coplanar with the inside surfaces 87 of the internal walls 66, 68 in order to maintain a pneumatic seal between the carrier 32 and the panels 48, 50, 52 and 54.

The use of four hollow corner structures 56–62 connecting four transparent panels 48–54 provide multiple longitudinal cavities which may be used as conduits or wire ways that permit wires to be run between the terminals 12 and 16 and the corner tube sections 24 and 28, respectively. Within the corner tube sections 24 and 28, the wires may be run to electrical junction boxes 100 and 102 which are connected by standard metal conduit 104 running within the corner tube sections 24, 28 and longitudinally along one side of the horizontal tube section 30.

Figure 3:
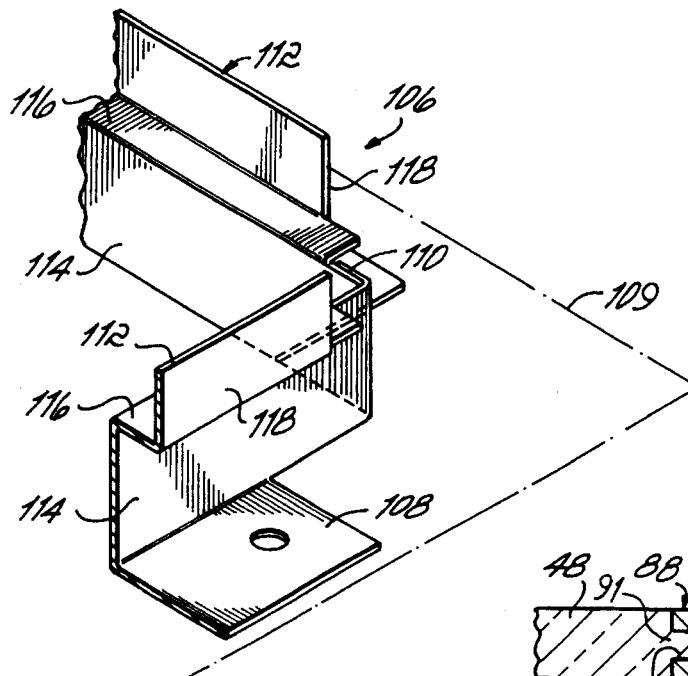
FIG. 3 is an enlarged view illustrating the structure of a transition collar receiving an end of the transport tube.

The four ends of the transparent tube sections 22 and 26 terminate into identical four transition collars one of which is shown as transition collar 106 in FIGS. 2 and 3. The transition collars are identical in construction, and therefore only transition collar 106 connecting the lower end of the transport tube section 22 to customer terminal 12 will be described in detail. The transition collar 106 has a mounting flange 108 extending around one end of the transition collar 106. The mounting flange 108 is welded to a bracket 109 within the customer and teller terminals 12 and 16. The mounting flange 108 is bolted to a surface within the corner tube sections 24 and 28. The other end 110 of the transition collar 106 has four identical offsets 112 extending from an edge of the walls 114. The offsets 112 have first surfaces 116 which extends perpendicular to the walls 114 and horizontally away from the transition collar 106 a distance equal to the thickness of the transparent panels. The offsets have second surfaces 118 extending vertically upward and perpendicular to the first surfaces 116 and parallel to the walls 114. The inside perimeter of the walls 114 is sized to be equal to the inside perimeter of the vertical tube sections. Therefore, as illustrated in FIGS. 2 and 3, one end of the vertical tube section 22 is slid into the transition collar 106 until the ends of the transparent panels contact the first surfaces 116 of the offsets 112. The second surfaces 118 of the offsets 112 capture the outside surfaces of the transparent panels 48–54 thereby restraining the panels from motion transverse to the center longitudinal axis of the tube section. Further, the transition from the inside surface of the walls 114 of the transition collar 106 to the inside surfaces of the transparent panels is smooth, thereby maintaining the integrity of the pneumatic seal between the carrier and the transport tube system.

When the carrier 32 drops in the vertical tube sections 22, 26, it compresses the trapped column of air beneath the carrier 32 in the vertical tube section, As that column of air continues to compress, substantial forces are applied against the inside surfaces of the vertical transport panels 48–54 tending to push the transparent panels away from each other.

In order to counteract those forces, a strap 120 is wrapped around the outside of the vertical tube section and the ends of the strap are connected with a screw or other fastener to one of the corner structures. Consequently, the strap 120 is effective to counteract the forces of the compressed air within the vertical tube section.

In use, power for the customer terminal may be obtained from a power source in the teller terminal; therefore, it is necessary to run power wires from the teller terminal to the customer terminal 12. The power may be used to operate an electromechanical device such as the motor 130 or other devices. Typically, power is distributed to such devices from a terminal strip 122, With the present invention, electrical wires 25 connecting the two terminals are run from a terminal block 122, past a transition collar 106, and into the longitudinal cavity 82 of corner structure 56. As shown in FIG. 1, the wires exit the corner structure 56 inside corner tube section 24 and are routed to the electrical junction box 100. The wires exit electrical junction box 100 and exit corner tube section 24 into conduit 104 which carries the wires to the corner tube section 28. The wires are routed within corner tube section 28 into electrical junction box 102 and from electrical junction box 102 into the longitudinal cavity of corner section 56 on vertical tube section 26. The wires then exit vertical tube section 26 and are connected to a terminal block (not shown) in the teller terminal 16.

In a similar manner, communication wires 124 connecting communications devices such as a speaker 132 or microphone 134 in the customer and teller terminals 12 and 16, respectively, to effect audio communication between the customer and teller, are run through other corner structures 60 of vertical tube sections 22,26, through the junction boxes 100,102 and conduit 104. Communications devices may also include a video camera and monitor at either or both of the terminals to permit unidirectional or bidirectional video communications. Third corner structures 58 of vertical tube sections 22 and 26, may be used to run the lower voltage control wires 126 connected to control devices such as switches 37, 42 and other control devices in the customer and teller terminals 12 and 16, respectively. Similarly, corner structures 62 may be used as conduits to run other wires 128. As will be appreciated, the corner structures 56–62 may be used as conduits to run wires between the terminals and to and from any other points in the transport tube structure.

While the present invention has been set forth by the description of the embodiments in considerable detail, it is not intended to restrict or in any way limit the claims to such detail. Additional advantages and modifications will readily appear to those who are skilled in the art. For example, the tang and slot connections of the edge connectors between the longitudinal edges of the transparent panels and corner structures may be replaced by a simple lap joint. Alternatively, other edge connectors may be used that join the transparent panels to the corner structures and maintain a smooth transition between the inside surfaces of the panels and the inside surfaces of the corner structures. The longitudinal cavity serving as a wire conduit may be limited to one or any number of the corner structures used. Further, the transparent panels may be made of alternative plastic materials or glass. The corner structures may be made of plastic material. The invention in its broadest aspects is therefore not limited to the specific details shown and described. Accordingly, departures may be made from such details without departing from the spirit or scope of applicant's general inventive concept.

What is claimed is:

1. A quadrilateral transport tube for transporting a carrier between terminals in a pneumatic transport tube system comprising:

four panels, each of the panels having two longitudinal edges with tangs cut therein and an internal surface between the two longitudinal edges forming a side of the quadrilateral transport tube; and four corner structures connected to said longitudinal edges of said four panels to form the quadrilateral transport tube, at least one of said corner structures having two internal walls connected together to form a generally perpendicular internal corner of the quadrilateral transport tube, each of the internal walls having an edge connector formed to receive and overlap with the tang of one of the panels to make the internal surface of the one of the panels substantially coplanar with an inside surface of the respective internal wall, an external corner member connected to the internal walls to form a longitudinal cavity bounded by the external corner member and extending longitudinally through the at least one of said corner structures, and wires extending through the longitudinal cavity.

2. The quadrilateral transport tube of claim 1 wherein each of said corner structures comprises:

two internal walls connected together to form a generally perpendicular internal corner of the quadrilateral transport tube, each of the internal walls having an edge connector formed to receive and overlap with the tang of one of the panels to make the internal surface of the one of the panels generally coplanar with an inside surface of the respective internal wall, and an external corner member connected to the internal walls to form a longitudinal cavity, bounded by the external corner member and extending longitudinally through the at least one of said four corner structures.

3. The quadrilateral transport tube of claim 1 wherein at least two of said panels are transparent.

4. The quadrilateral transport tube of claim 1 wherein quadrilateral transport tube has a square cross-section.

5. The quadrilateral transport tube of claim 2 wherein said internal corners of each of said corner structures are adapted to match an exterior shape of corners on the carrier.

6. A transport tube system connected between two terminals for transporting a carrier between the terminals, the transport tube system comprising:

a generally horizontal quadrilateral tube section;

two generally vertical quadrilateral tube sections, each vertical quadrilateral tube section for connecting one end of said horizontal quadrilateral tube section with one of the terminals, at least one of said vertical quadrilateral tube sections including four panels, each of the panels having two longitudinal edges with tangs cut therein and an internal surface between the two longitudinal edges forming one side of said one of said vertical quadrilateral tube sections, and four corner structures connected to said longitudinal edges of said four panels, thereby forming said one of said vertical quadrilateral tube sections, at least one of said corner structures having 'two internal walls connected together to form a generally perpendicular internal corner of the quadrilateral transport tube, each of the internal walls having an edge connector formed to receive and overlap with the tang of one of the panels to make the internal surface of the one of the panels substantially coplanar with an inside surface of the respective internal wall, and an external corner member connected to the internal walls to form a longitudinal cavity bounded by the external corner member and extending longitudinally through the at least one of said corner structures;

first electrical means associated with an upper end of said vertical quadrilateral tube sections;

second electrical means associated with a lower end of said vertical quadrilateral tube sections; and electrical wiring located within said longitudinal cavity of said one of said vertical quadrilateral tube sections for interconnecting said first and second electrical means.

7. The transport tube system of claim 6 wherein said second electrical means include voice communication devices and said transport tube system has voice communication wires passing through said longitudinal cavity of said corner structures for interconnecting said voice communications devices.

8. The transport tube system of claim 6 wherein said second electrical means include electrical control devices, and said transport tube system has control signal wires passing through said longitudinal cavity of said corner structure for interconnecting said control devices.

9. The transport tube system of claim 6 wherein at least one of said first and second electrical means include an electromechanical device, and said transport tube system has power wires passing through said longitudinal cavity of said corner structure for interconnecting said electromechanical device to a source of electric power.

10. The transport tube system of claim 6 wherein said one of said vertical tube sections further comprises a transition tube section connected to an end of said quadrilateral vertical tube section.

11. The transport tube system of claim 6 wherein at least two of said panels are transport.

12. The transport tube system of claim 11 wherein both of said quadrilateral tube sections has an identical construction and both of said quadrilateral tube sections have a square cross-section.

13. A transport tube system connected between two terminals for transporting a carrier between the terminals, the transport tube system comprising:

a generally horizontal quadrilateral tube section;

two generally vertical quadrilateral tube sections, each vertical quadrilateral tube section for connecting one end of said horizontal quadrilateral tube section with one of the terminals, at least one of said vertical quadrilateral tube sections including four transparent panels, each of the transparent panels having two longitudinal edges with tangs cut therein and an internal surface between the tow longitudinal edges to form one side of said one of said vertical quadrilateral tube sections, and four corner structures connected to said longitudinal edges of said four transparent panels, thereby forming said one of said vertical quadrilateral tube sections, at least two of said corner structures having two internal walls connected together to form a generally perpendicular internal corner of the quadrilateral transport tube, each of the internal walls having an edge connector formed to receive and overlap with the tang of one of the panels to make the internal surface of the one of the panels substantially coplanar with an inside surface of the respective internal wall, and an external corner member connected to the internal walls to form a longitudinal cavity bounded by the external corner member and extending longitudinally through the at least one of said corner structures; communications devices associated with one of said terminals; control devices associated with said one of said terminals;

an electromechanical device associated with said one of said terminals; and electrical wiring located within said longitudinal cavity of said one of said vertical quadrilateral tube sections and connected to at least one of said devices associated with said one of said terminals.

14. The apparatus of claim 13 wherein at least one of the at least two corner structure a first longitudinal cavity and connecting to said electromechanical device, and a second of the at least two corner structures has electrical wires passing through a second longitudinal cavity and connecting to one of said communications devices.

15. The apparatus of claim 14 wherein a third of said corner structures comprises:

two internal walls connected together to form a generally perpendicular internal corner of the quadrilateral transport tube, each of the internal walls having an edge connector formed to receive and overlap with the tang of one of the panels to make the internal surface of the one of the panels substantially coplanar with an inside surface of the respective internal wall, an external corner member connected to the internal walls to form a longitudinal cavity bounded by the external corner member and extending longitudinally through the at least one of said corner structures; and said third corner structure having electrical wires passing through said third longitudinal cavity and connecting to one of said control devices.

\* \* \* \* \*